(12) United States Patent  
Peterson et al.

(10) Patent No.: US 9,195,396 B2  
(45) Date of Patent: Nov. 24, 2015

(54) ESTIMATING ACCESS FREQUENCY STATISTICS FOR STORAGE DEVICE

(71) Applicant: Fusion-io, Inc., Salt Lake, UT (US)

(72) Inventors: James G. Peterson, San Jose, CA (US); Swaminathan Sundararaman, San Jose, CA (US)

(73) Assignee: SanDisk Technologies, Inc., Plano, TX (US)

( * ) Notice: Subject to any disclaimer, the term of this patent is extended or adjusted under 35 U.S.C. 154(b) by 361 days.

(21) Appl. No.: 13/831,475

(22) Filed: Mar. 14, 2013

(65) Prior Publication Data

US 2014/0281260 A1  Sep. 18, 2014

(51) Int. Cl.
| | |
|---|---|
| *G06F 12/00* | (2006.01) |
| *G06F 3/06* | (2006.01) |
| *G06F 11/00* | (2006.01) |
| *G06F 12/02* | (2006.01) |

(52) U.S. Cl.
CPC .............. *G06F 3/0616* (2013.01); *G06F 3/064* (2013.01); *G06F 3/0679* (2013.01); *G06F 11/00* (2013.01); *G06F 12/0246* (2013.01)

(58) Field of Classification Search
None
See application file for complete search history.

(56) References Cited

U.S. PATENT DOCUMENTS

| | | |
|---|---|---|
| 2012/0221772 A1 | 8/2012 | Seol et al. |
| 2012/0226963 A1 | 9/2012 | Bivens et al. |
| 2012/0240013 A1 | 9/2012 | Wong et al. |
| 2012/0297258 A1 | 11/2012 | Flynn et al. |
| 2012/0304039 A1 | 11/2012 | Peterson et al. |
| 2013/0036262 A1 | 2/2013 | Flynn et al. |

*Primary Examiner* — Baboucarr Faal
(74) *Attorney, Agent, or Firm* — Kunzler Law Group, PC

(57) ABSTRACT

Techniques are disclosed relating to determining statistics associated with the storage of data on a medium. In one embodiment, a computing system maintains a management statistic for a storage device, and uses the management statistic as a proxy for a workload statistic for a storage block within the storage device. In some embodiments, the storage block is a first storage block included within a second storage block of the storage device. In one embodiment, the management statistic is a timestamp indicative of when a write operation was performed for the second storage block; the workload statistic is a write frequency of the first storage block. In one embodiment, the management statistic is a number of read operations performed for the second storage block; the using includes deriving, based on the number of read operations, a read frequency for the first storage block as the workload statistic.

6 Claims, 9 Drawing Sheets

730

Determine Association of First Storage Block with Second Storage Block
732

↓

Make Determination Associated with Second Storage Block Based on Access Frequency Statistic of First Storage Block
734

ESTIMATING ACCESS FREQUENCY STATISTICS FOR STORAGE DEVICE

BACKGROUND

1. Technical Field

This disclosure relates generally to accessing data on a physical recording medium, and more specifically to determining statistics associated with the storage of data on such a medium.

2. Description of the Related Art

A set of data is typically written to solid-state storage media by performing an erase operation on a group of memory cells followed by a program operation on those cells. Because of the small size of these cells and the high voltages used to perform these operations, the transistors within the cells begin to degrade over time such that only a limited number of erase operations and program operations can be performed. To improve the longevity of memory cells, modern storage systems may implement a log-structured storage to ensure that writes to cells are more evenly distributed across the storage to produce better wear leveling (as opposed to writing particular cells frequently while other cells go unused).

While storing data in this manner can improve wear leveling, memory cells may still degrade to the point that they are no longer able to store information accurately. That is, a particular value may be written to a block of memory cells; however, when it is subsequently read, the value may not be retrievable upon being read from memory (or may be read incorrectly). Even still, memory cells that have minimal wear may still have limits on how long they can maintain a charge due to leakage current. As a result, in some instances, various statistics may be maintained to determine the reliability of memory cells with a storage device.

SUMMARY

The present disclosure describes embodiments in which workload statistics are estimated for a storage device based on other maintained statistics for the storage device. Accordingly, in various embodiments, management statistics may be maintained for one or more storage blocks within a storage device (e.g., in some embodiments, for erase blocks, storage banks, packets, etc.). Such statistics may be used to facilitate management of various aspects of the storage device. For example, in some embodiments, one or more statistics may be maintained to determine the reliability of data stored within storage blocks. In some instances, it may be desirable to determine workload statistics that cannot easily be tracked (e.g., due to granularity of such information, limited processing and memory resources, etc.). In various embodiments discussed below, maintained statistics may be used as proxies for one or more of these desired statistics.

In one embodiment, a method is disclosed that includes maintaining, via a computing system, a management statistic for a storage device. In such an embodiment, the management statistic is usable by the computing system to facilitate management of the storage device. The method further includes using the management statistic as a proxy for a workload statistic for a storage block within the storage device.

In another embodiment, an apparatus is disclosed that includes a reliability tracking module and an estimation module. The reliability tracking module is configured to track a reliability statistic indicative of a reliability of a storage block within a storage device to store data accurately. The estimation module is configured to estimate an access frequency statistic for an address associated with data in the storage block.

In still another embodiment, an apparatus is disclosed that includes a tracking module and a derivation module. The tracking module is configured to track a first access frequency statistic for a storage block within a storage device. The derivation module is configured to derive, based on the first access frequency statistic, a second access frequency statistic for a second storage block included within the first storage block.

In yet another embodiment, an apparatus is disclosed that includes a first means and a second means. The first means is for storing data using a log-structure and includes a plurality of storage blocks. The second means is for using a first access frequency statistic for a first of the plurality of storage blocks as a proxy for a second access frequency statistic for a second storage block included within the first storage block.

Figure 1:
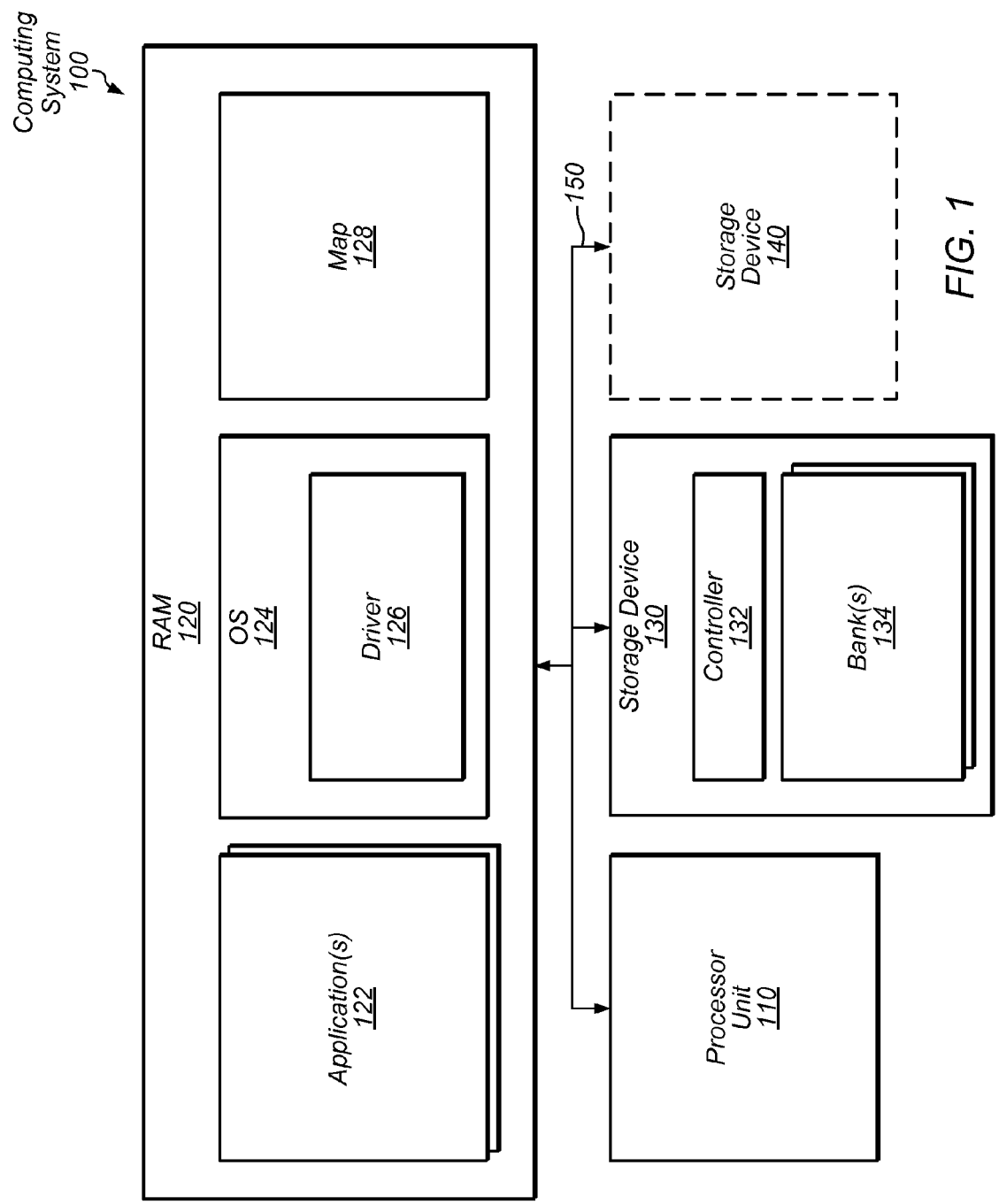
FIG. 1 is a block diagram illustrating one embodiment of a computing system that includes a storage device and maintains access frequency statistics for the storage device.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware— for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. §112, sixth paragraph, for that unit/circuit/component.

Various units, circuits, or other components may be described using the terms "first," "second," etc. These terms are used as labels for nouns that they precede, and do not imply any type of ordering (e.g., spatial, temporal, logical, etc.). For example, in a storage device having multiple storage blocks, the terms "first" and "second" storage blocks can be used to refer to any two storage blocks (e.g., including storage blocks that are included within other storage blocks). In other words, the "first" and "second" storage blocks are not limited to the initial two storage blocks of the storage device.

DETAILED DESCRIPTION

Figure 2:
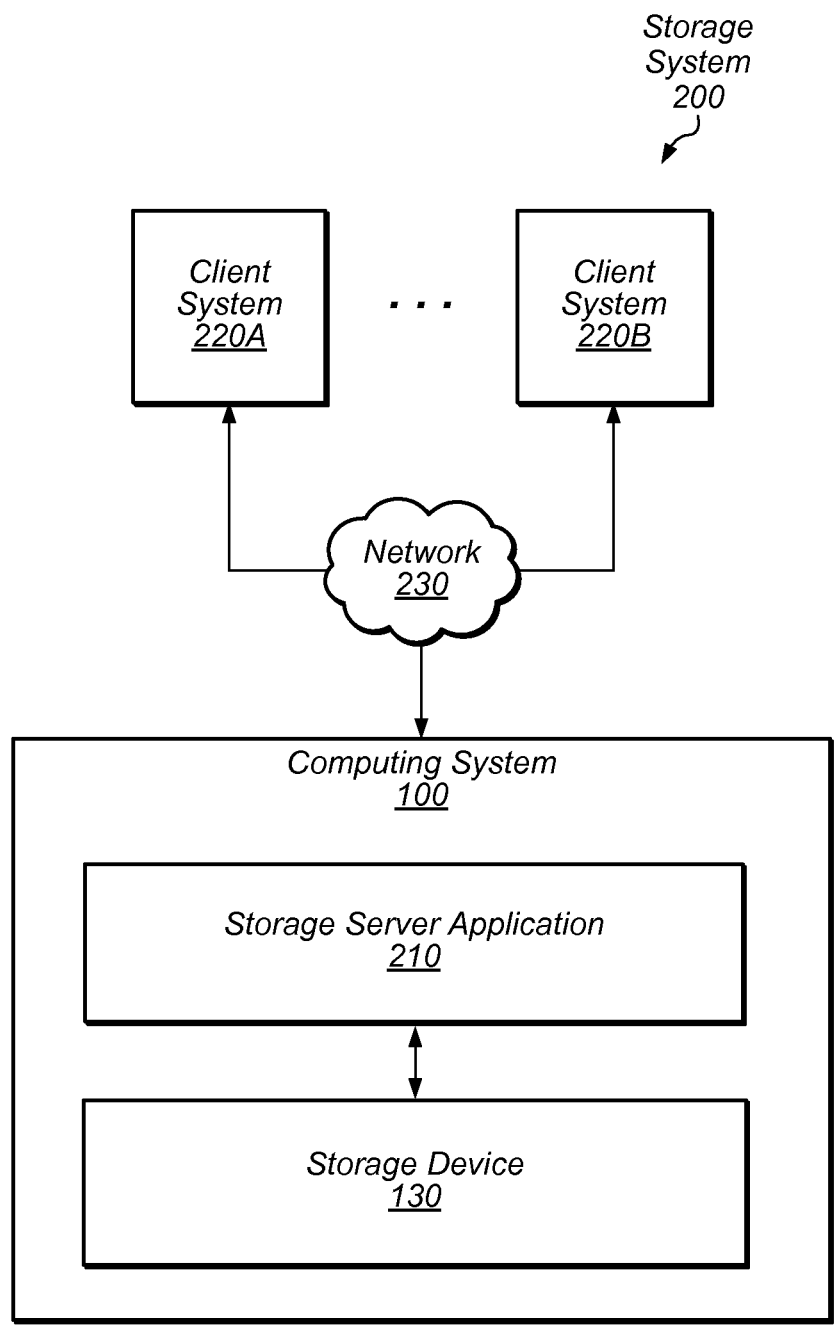
FIG. 2 is a block diagram illustrating one embodiment of a storage system including the computing system.

The disclosure initially describes, with reference to FIGS. 1 and 2, a computing system that estimates statistics for a storage device based on already maintained statistics. To facilitate this description, logical and physical address spaces associated with the storage device are described with reference to FIGS. 3A-3C. Embodiments in which maintained management statistics for the storage device are used as proxies of workload statistics are described in further detail with reference to FIGS. 4-7B.

Turning now to FIG. 1, a block diagram of computing system 100 is depicted. Computing system 100 may be any suitable type of computing device such as a server, laptop, desktop, a mobile device, etc. In some embodiments, computing system 100 may include multiple computing devices working together. For example, in one embodiment, computing system 100 may be multiple servers coupled together at a data center configured to store data on behalf of multiple clients, such as the storage system discussed below in conjunction with FIG. 2. In the illustrated embodiment, computing system 100 includes a processor unit 110, random access memory (RAM) 120, storage device 130, and storage device 140 coupled together via an interconnect 150. As shown, RAM 120 may include program instructions for one or more applications 122 and a operating system (OS) 124 executable by processor unit 110. RAM 120 may also include a map 128. OS 124 may include a driver 126 for storage device 130, which, in turn, may include a controller 132 and one or more storage banks 134.

In various embodiments, driver 126 is described as having various functionality. This functionality may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within OS 124 should not be seen as limiting, but rather as a depiction of an exemplary embodiment.

Storage device 130 is representative of any physical medium upon which data can be recorded. As used herein, the term "recorded" refers broadly to the process of an electronic computing device storing, writing or otherwise transferring one or more data values on to some physical recording medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to storage device 130) in FIG. 1 and elsewhere in this disclosure may refer to volatile and/or non-volatile media. Such media may also be referred to herein as "memory," and portions of such media may be referred to as "blocks," "cells," "storage blocks," "memory blocks," etc. Collectively, a group of these blocks may be referred to as a "storage array," "memory array," etc.

References in this disclosure to "accessing" data in storage device 130 refers to any type of transaction, including writing data to storage device 130 and/or reading data from storage device 130, as well as, TRIM operations, maintenance accesses, discovery accesses, load and store operations under memory semantics, and the like. Further, given the broad definitions of "storage" and "memory" referred to above, these accesses may be applicable to a storage device that has non-volatile memory and/or volatile components.

In some embodiments, storage device 130 may be implemented such that it includes non-volatile memory. Accordingly, in such an embodiment, storage banks 134 may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage device 130 may be implemented such that it includes non-volatile solid-state memory. Accordingly, in such an embodiment, storage banks 134 may include any suitable type of solid-state storage media including, but not limited to, NAND flash memory, NOR flash memory, nano RAM ("NRAM"), magneto-resistive RAM ("MRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), etc. In some embodiments, storage banks 134 may include multiple, different types of solid-state storage media.

In other embodiments, storage device 130 may be implemented such that it includes volatile memory. Storage banks 134 may thus correspond to any suitable volatile memory including, but not limited to such as RAM, dynamic RAM (DRAM), static RAM (SRAM), synchronous dynamic RAM (SDRAM), etc. Although shown independently of processor unit 110, in some embodiments, storage device 130 may correspond to memory within processor unit 110 such as one or more cache levels (e.g., L1, L2, L3, etc.) within processor unit 110.

In sum, various functionality will be described herein pertaining to storage device 130. Such functionality may be applicable to any suitable form of memory including both non-volatile and volatile forms. Thus, while particular embodiments of driver 126 are described herein within the context of non-volatile solid-state memory arrays, driver 126 may also be applicable to other recording media such as volatile memories and other types of non-volatile memories, particularly those that include a reclamation process.

In some embodiments, computing system 100 may include additional storage devices such as storage device 140 (as indicated by the dotted lined). In some embodiments, memory within storage device 140 may all be non-volatile such as the examples listed above; in other embodiments, storage device 140 may include types of volatile memory such as those listed above. In some embodiments, storage device 140 may correspond to network attached storage (NAS) or a storage area network (SAN) coupled to computing system 100 via a network. In some embodiments, storage device 140 may store data in a similar manner as storage device 130 including, for example, organizing data as a log structure. However, in other embodiments, storage device 140 may organize data differently than storage device 130.

In some embodiments, storage device 130 may be configured to implement a cache for storage device 140. (Such an implementation may be described as a "cache-device" implementation.) For example, in one embodiment, storage device 140 may have slower access times than storage device 130, but may have a higher storage capacity than storage device 130. As data accesses are performed, data may be loaded into (i.e., cached in) storage device 130 from storage device 140. When subsequent data accesses are performed for data in storage device 130, those accesses may experience lower latencies. Storage device 130 may implement any suitable caching scheme. In one embodiment, storage device 130 is configured as a write-through cache in which a write operation of data to storage device 130 also causes a write operation of the data to storage device 140 before completion of the write is acknowledged. In another embodiment, storage device 130 is configured as a write-back cache in which data is written to storage device 140 in conjunction with being evicted from storage device 130. (As used herein, the term "destaging" refers to the writing of data to another storage. The term "eviction" refers to data being moved out of a cache (e.g., once the data is moved out of the cache the data may be marked invalid—a term defined below)). Data for which the most current, up-to-date, version is in the cache may be referred to as "dirty" data. Dirty data is destaged before the data is evicted. In other embodiments, however, storage device 130 may not be configured as a cache for storage device 140. (Such an implementation may be described as a "block-IO-device" implementation.) In contrast to a cache-device implementation (discussed above), cache eviction does not occur in a block-IO-device implementation as storage device 130 is not functioning as a cache. Still, in other embodiments, computing system 100 may not include storage device 140.

Controller 132, in one embodiment, is configured to manage operation of storage device 130. Accordingly, controller 132 may facilitate performance of read operations at specified addresses (e.g., "physical addresses" as discussed below) including selecting the appropriate banks 134 and accessing the data within the appropriate cells within those banks. Controller 132 may facilitate performance of write operations including programming of particular cells. Controller 132 may also perform preparation operations to permit subsequent writes to storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 150. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), etc. In some embodiments, controller 132 may also perform other operations such as error checking, data compression, encryption and decryption, packet assembly and disassembly, etc.

In various embodiments, storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to a range of addresses that can be used to specify data within a storage device. As will be described below, a log-structured storage may have both logical and physical address spaces. The term "logical address space" refers to an address space as perceived by higher-level processes (e.g., applications 122 and OS 124) even though this address space may not be representative of how data is actually organized on the physical media of storage device 130 or the actual number of physical address locations actually in use, reserved, or allocated to a higher-level process. In contrast, the term "physical address space" refers to the address space used by lower-level processes and may be indicative of how data is organized on the physical media of storage device 130 and the actual number of physical address locations in use by a higher-level process. Embodiments of logical and physical address spaces are discussed in further detail in conjunction with FIGS. 3A and 3B, respectively. One embodiment of a log structure is discussed in conjunction with FIG. 3C.

In various embodiments, using a log structure may permit multiple instances of a set of data to be present in storage device 130 as the data is written, modified, and rewritten to storage. As part of tracking data in a physical address space, older instances of stored data (i.e., those instances that are not the current instance) may be indicated as invalid. For example, in one embodiment, when a value is to be updated, the value may be written at a storage block specified by the current append point (rather than at the location where the value was previously stored). In response to the write being successfully performed, any previously stored instances of that value may be marked as invalid. As used herein, the term "invalid" refers to data that no longer needs to be stored by the system (e.g., because a newer copy of the data exists). Similarly, the term "invalidating" refers to the marking of data as invalid (e.g., storing a record in a data structure). Invalidating may also refer to the writing an instance of data to storage device 130 when a previous instance of the data exists on device 130 (the latter instance being made obsolete by the writing of the new instance).

Map 128, in one embodiment, is used to map (i.e., translate) logical addresses to physical addresses within storage device 130. Accordingly, as data becomes moved and invalidated, it may reside in different physical addresses on storage device 130 over time. Through the use of map 128, however, an application may be able access a most recent set of data by specifying the same logical address (e.g., the same logical block address (LBA)) even though two or more versions of the data may reside in different physical addresses. Map 128 may be implemented using any suitable data structure. According, in one embodiment, map 128 is a binary-tree data structure. In others embodiments, map 128 may be an array, a linked list, a hash table, etc. In some embodiments, map 128 may be implemented using multiple data structures.

OS 124, in one embodiment, implements a file system to facilitate the retrieval of data by applications 122. Accordingly, in some instances, an application 122 may access data within storages 130 by specifying a corresponding file name to OS 124 via an application programming interface (API) request (in other instances, an application 122 may access data directly by specifying an address to be read from or written to). In response to receiving the request, OS 124 may access various file system information corresponding to directories and files (e.g., within a set of inodes, file allocation tables, etc.) to determine one or more addresses where data for the file is stored.

Driver 126, in one embodiment, is executable to permit applications 122 and OS 124 to interact with storage device 130. Accordingly, driver 126 may receive requests to perform read and write operations at specified logical block addresses and may issue corresponding commands to controller 132 to implement those operations. In some embodiments, driver 126 manages garbage collection for storage device 130 to reclaim storage blocks with invalid data. As used herein, "reclaiming" a storage block or "reclamation" of a storage block refers to preparing the storage block for reuse (i.e., so that the storage block can store new data). In the case of flash media, reclamation may include copying valid data out of the storage block and erasing the block. In some embodiments, to facilitate performance of read and write operations, driver 126 also maps logical addresses (e.g., LBAs) to corresponding physical addresses (in other embodiments, mapping logical addresses to physical addresses may be performed elsewhere, such as at controller 132). Accordingly, driver 126 may also manage map 128 including adding and removing translations from map 128 as data is manipulated on storage device 130.

In various embodiments, driver 126 may maintain various management statistics for storage blocks (such as those discussed with respect to FIG. 3B) that are usable to facilitate management of storage device 130. These statistics may include reliability statistics maintained for determining the reliability of data stored in storage device 130. For example, in the case of flash media, a given memory cell may be capable of accurately storing data for a limited period (such as up to a month) after which the data may become corrupted. Still further, if multiple read operations of the cell are performed, this retention period may be significantly reduced. As a result, driver 126 may track various reliability statistics that may be indicative of the potential residual bit error rate (RBER) for data stored on storage device. In one embodiment, these statistics include maintaining a timestamp of when data was written to a device 130. If driver 126 determines that a set of data is approaching a particular threshold for how long data can be stored, driver 126 may refresh the data by reading it and writing it back. Similarly, in one embodiment, these reliability statistics include a respect number of read operations performed to each storage block in storage device 130. If driver 126 determines that the number of read operations for a given storage block reaches a particular threshold that when exceeded may result in read disturb errors (the condition in which one or more bits are read incorrectly), driver 126 may refresh the data to prevent potential loss. In some embodiments, driver 126 may maintain management statistics at a high level; however it may impractical to determine those statistics at a finer level of granularity. For example, storage device 130 may have a multiple-terabyte capacity. Tracking a respective number of read operations and a respective timestamp for each addressable block in device 130 might consume more than the capacity of device 130.

In various embodiments, however, driver 126 may perform various functions that would benefit from having statistics at a finer level of granularity, or at least an approximation of those statistics. As will be described in further detail with respect to FIG. 4, these functions may include those that factor in workload statistics (i.e., read frequencies and/or write frequencies for storage blocks—referred to generally as access frequencies) in making various determinations. Accordingly, in various embodiments, driver 126 may use reliability statistics maintained at a higher level (e.g., on a per bank basis, erase block basis, etc.) as proxies for access frequency statistics at a lower level (e.g., on a per logical-block-address basis). In some instances, this usage may include repurposing reliability statistics for access frequency statistics without actually computing the lower-level statistic. That is, driver 126 may use a higher-level statistic as a factor in making a determination in lieu of the lower-level statistic. In other instance, driver 126 may compute an estimate of a lower-level statistic using the maintained higher-level statistic, and use the estimate as a factor in making a determination. Estimating access frequency statistics and various applications for using those statistics are discussed in further detail below with respect to FIG. 4.

Turning now to FIG. 2, a block diagram of a storage system 200 including computing system 100 is depicted. As discussed above, computing system 100 may include one or more applications that operate on data stored in storage device 130. In the illustrated embodiment, computing system 100 executes a storage server application 210 to enable client systems 220A and 220B to access and store data in storage device 130 via network 230. For example, in one embodiment, storage system 200 may be associated within an enterprise environment in which server application 210 distributes enterprise data from storage device 130 to clients 220. In some embodiments, clients 220 may execute other server applications such as web servers, mail servers, virtual private network (VPN) servers, etc. to further distribute data to other computing systems. Accordingly, in some embodiments, storage server application 210 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

Figure 3A:
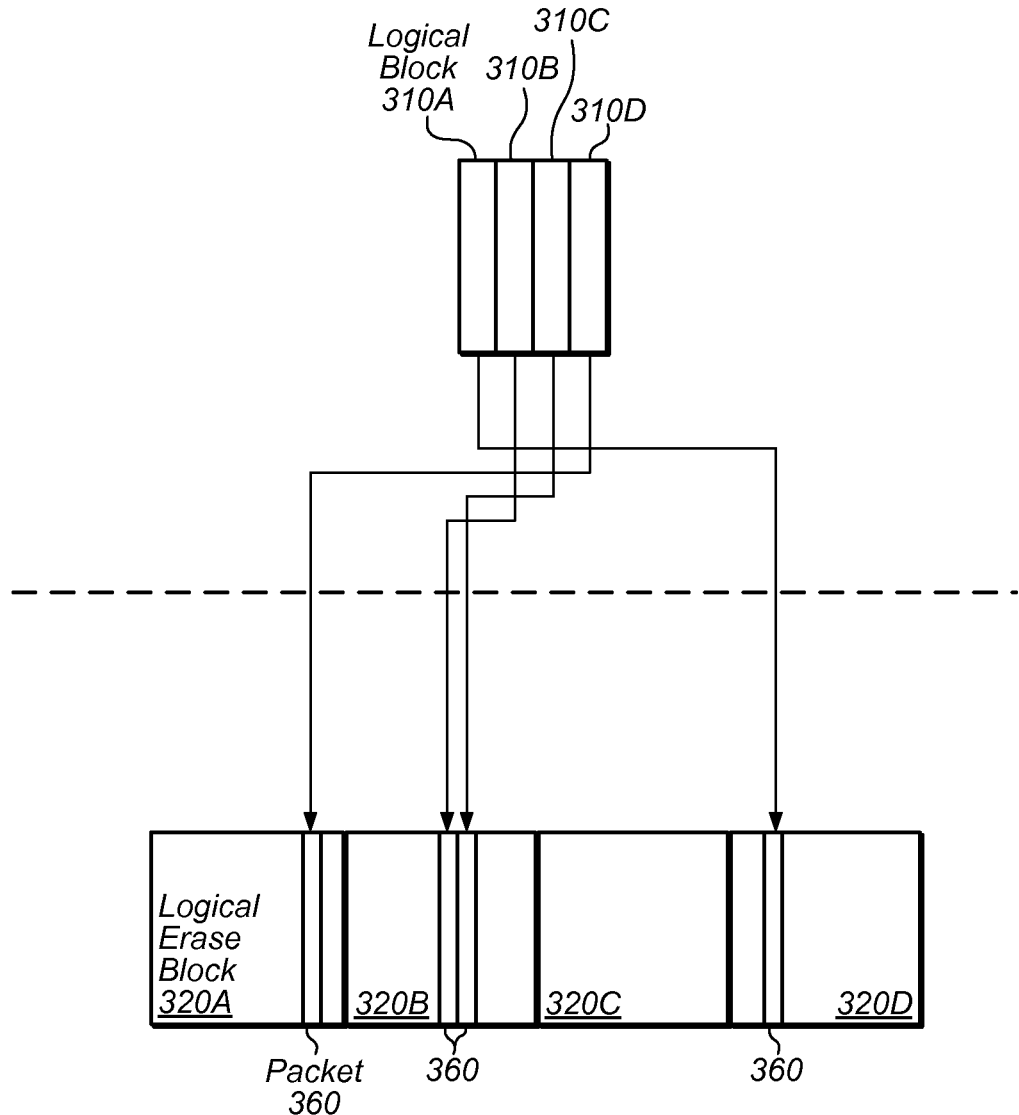
FIGS. 3A-3C are block diagrams illustrating embodiments of logical and physical address spaces.

Turning now to FIG. 3A, an exemplary mapping of a logical address space 302 to a physical address space 304 is depicted. In one embodiment, logical address space 302 represents the organization of data as perceived by higher-level processes such as applications 122 and OS 124. In one embodiment, physical address space 304 represents the organization of data on the physical media.

Logical address space 302, in one embodiment, is divided into logical addresses corresponding to respective logical blocks 310A-310D (also referred to as sectors). In some embodiments, the logical addresses are LBAs (in other embodiments, the logical addresses may correspond to some other form of logical identifiers). In one embodiment, sectors/blocks 310 represent the smallest block of data associated with a given logical address. As but one example, a block 310 may be approximately 512 bytes in size (while logical erase blocks and logical pages discussed below may be approximately 40 MB and 8 kB, respectively).

Physical address space 304, in one embodiment, is divided into physical addresses corresponding to the arrangement of data on the physical recoding media. As will be discussed in further detail with respect to FIG. 3B, in one embodiment, the content of logical blocks 310 may be stored as packets 360 within logical erase blocks 320. As discussed with respect to FIG. 3C, in various embodiments, physical address space 304 may be organized as a log structure, in which write operations may be performed at only one or more append points.

Figure 3B:
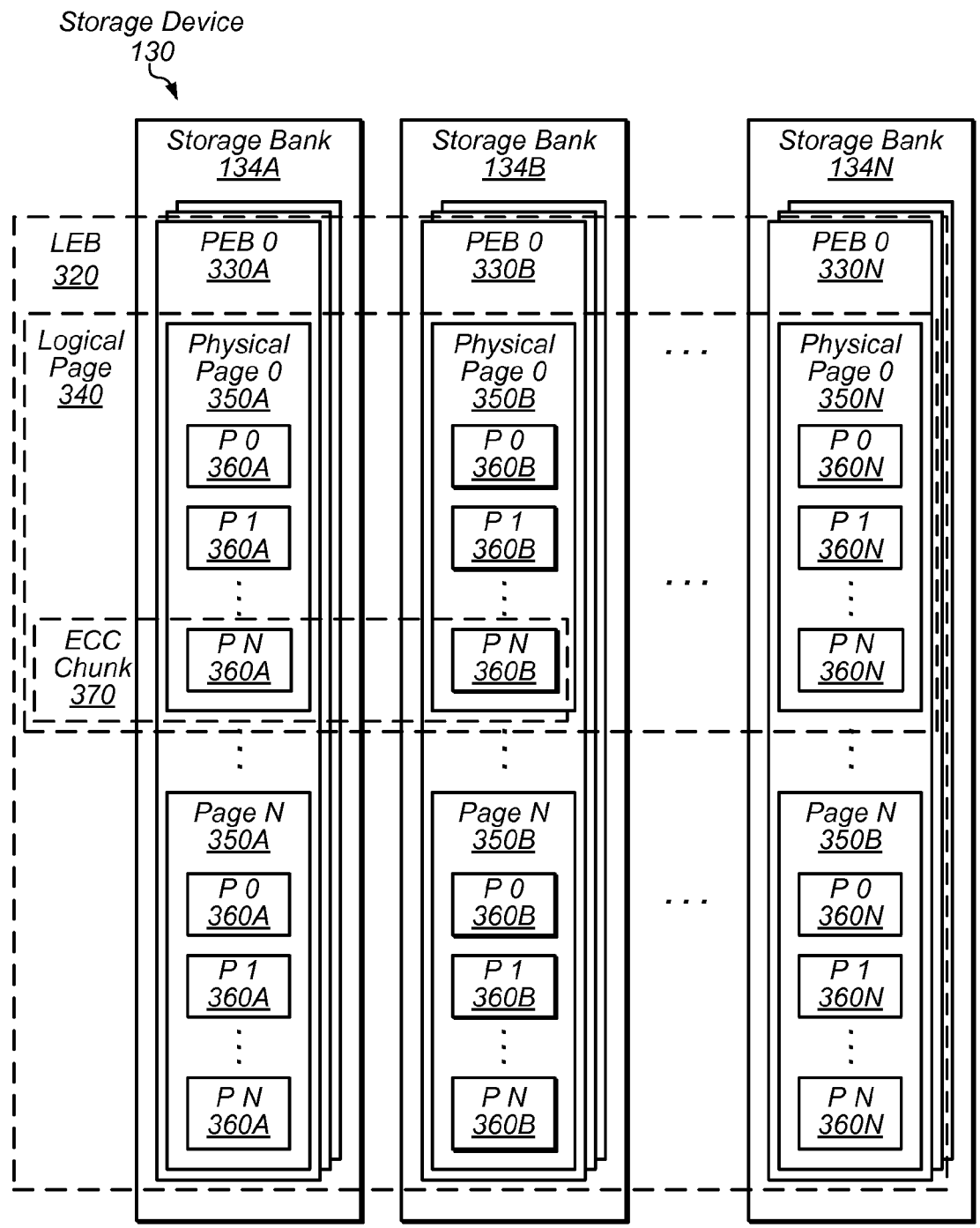

Turning now to FIG. 3B, a block diagram of storage blocks within storage device 130 is depicted. In the illustrated embodiment, storage device 130 is organized into logical erase blocks (LEBs) 320 that include multiple physical erase blocks (PEBs) 330, which are located in separate storage banks 134. A logical erase block 320 is further divided into multiple logical pages 340 that, in turn, include multiple physical pages 350. Pages 350 include multiple packets 360, which may be grouped into error correction code (ECC) chunks 370.

As used herein, the term "erase block" refers broadly to a logical erase block or a physical erase block. In one embodiment, a physical erase block 330 represent the smallest storage block with a given bank 134 that can be erased at a given time (e.g., due to the wiring of cells on the die). In one embodiment, logical erase blocks 320 represent the smallest block erasable by controller 132 in response to receiving an erase command. In such an embodiment, when controller 132 receives an erase command specifying a particular logical erase block 320, controller 132 may erase each physical erase block 330 within the block 320 simultaneously. It is noted that physical erase blocks 330 within a given logical erase block 320 (e.g., blocks 330A and 330B) may be considered as contiguous in physical address space 304 even though they reside in separate banks 134. Thus, the term "contiguous" may be applicable not only to data stored within the same physical medium, but also to data stored within separate media.

In one embodiment, a physical page 350 represents the smallest storage block within a given bank 134 that can be written to at a given time. In one embodiment, a logical page 340 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 340 across multiple banks 134 may result in faster access times for a set of data when multiple banks 134 are accessed in parallel.

In one embodiment, a packet 360 represents the smallest storage block within a given bank 134 that can be read at a given time. In one embodiment, an ECC chunk 370 is the smallest storage block readable by controller 132. In some embodiments, packets 360 may be slightly larger than logical blocks 310 as they may include the contents of a logical block 310 (or multiple blocks 310 in some instances) as well as a packet header.

In some embodiments, driver 126 may associate metadata with one or more of storage blocks 320-370. As used herein, the term "metadata" refers to system data usable to facilitate operation of solid-state storage device 130; metadata stands in contrast to, for example, data produced by an applications (i.e., "application data") or forms of data that would be considered by an operating system as "user data." For example, in one embodiment, a logical erase block 320 may include metadata specifying, without limitation, usage statistics (e.g., the number of program erase cycles performed on that block 320), health statistics (e.g., a value indicative of how often corrupted data has been read from that block 320), security or access control parameters, sequence information (e.g., a sequence indicator), a persistent metadata flag (e.g., indicating inclusion in an atomic storage operation), a transaction identifier, or the like. In some embodiments, a logical erase block 320 includes metadata identifying the VSUs 310 for which it stores packets as well as the respective numbers of stored packet for each VSU 310. In one embodiment, the header within a packet 360 may include packet metadata such as one or more LBAs associated with the contained data, the packet size, linkages to other packets, error correction checksums, etc. In various embodiments, driver 126 may use this information, along with other forms of metadata, to manage operation of storage device 130. For example, driver 126 might use this information to facilitate performance of read and write operations, recover storage device 130 to a previous state (including, for example, reconstruction of various data structures used by driver and/or replaying a sequence of storage operations performed on storage device 130), etc. As will be described with respect to FIG. 4, various forms of this metadata may be used to estimate access frequency statistics.

Figure 3C:
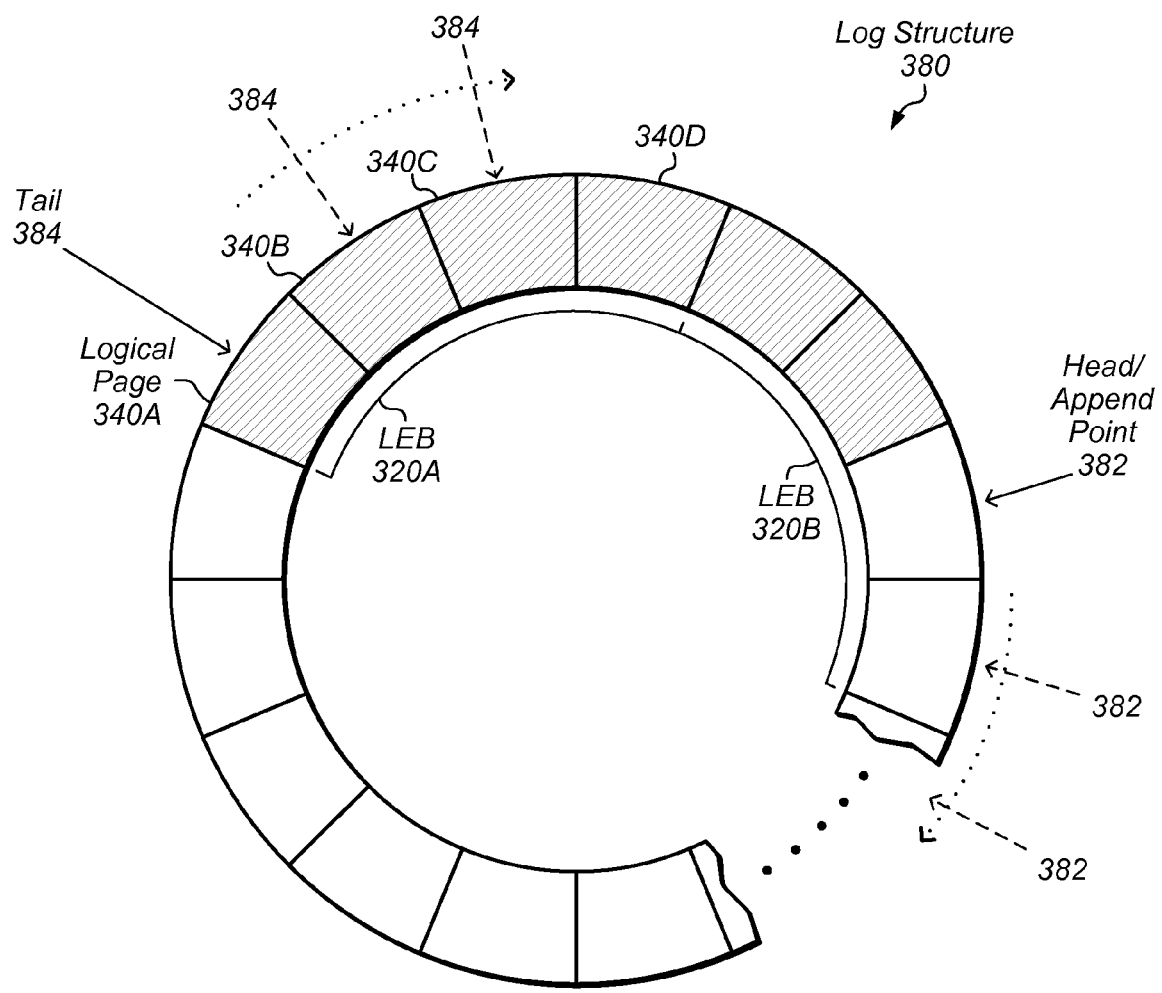

Turning now to FIG. 3C, a block diagram of log structure 380 within physical address space 304 is depicted. As shown, in various embodiments, data is stored sequentially at an append point 382 (also referred to as the "head") that starts at an initial logical page 340—e.g., page 340A. As additional data is stored, append point 382 advances to subsequent pages 340 in log structure 380—e.g., page 340B, 340C, and so on. (As used herein, the term "adjacent" may be used to describe storage blocks that are written one after the other in sequential order. For example, as shown, logical page 340A is adjacent to logical page 340B; LEB 320A is adjacent to LEB 320B.) Eventually, after storing enough data, the append point 382 reaches the "last" page 340 in storage device 130, at which point the append point 382 wraps back to the initial page 340. Thus, log structure 380 is depicted as a loop/cycle. As more data is stored, the number of available pages 340 (shown as unshaded pages 340) decreases and the number of used pages 340 (shown as shaded pages 340) increases. As discussed above, in order to reuse these pages 340 (i.e., make them available to receive further writes), in one embodiment, driver 126 performs erase operations on logical erase blocks 320. In one embodiment, a tail 384 is maintained to identify the oldest page 340 still in use within structure 380 (pages other than the one located at the tail are considered to be younger than the tail). When the logical erase block 320 with the oldest page 340 is eventually erased, tail 384 is advanced forward to the next oldest page 340 in use at the end of log structure 380.

In general, data that is modified less frequently than other data in storage device 130 will migrate towards tail 384 (such data may be described as having a "colder temperature" or simply as "cold data"). On the other hand, data that is modified more frequently (described as having a "hotter temperature" or as "hot" data) will typically be located closer to head 382. Thus, valid data located in LEB 320A is likely "colder" than data in LEB 320B.

It is noted that, in other embodiments, storage device 130 may organized in a non-log-structured format.

Figure 4:
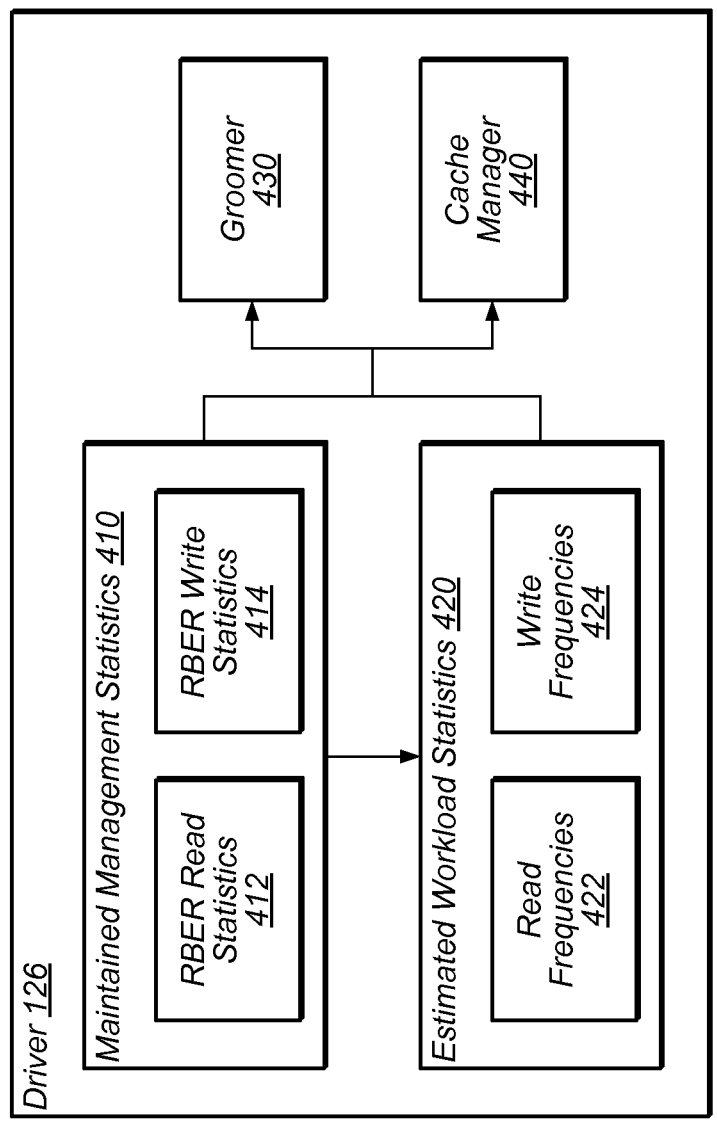
FIG. 4 is a block diagram illustrating one embodiment of a driver for the storage device that is executable to determine statistics associated with the storage device.

Turning now to FIG. 4, a block diagram of driver 126 is depicted. As discussed above, in various embodiments, driver 126 maintains reliability statistics for management of storage device 130, and may use one or more of these statistics as a proxy for access frequency statistics. Accordingly, in the illustrated embodiment, driver 126 includes maintained management statistics 410 and estimated workload statistics 420. As shown, driver 126 may also include a groomer 430 and a cache manager 440, which may use these statistics 410 and/or 420.

Maintained management statistics 410, in one embodiment, are statistics that are tracked (as opposed to being estimated from other statistics) to facilitate management of storage device 410. As discussed above, in various embodiments, these statistics include reliability statistics usable to determine when data may need to be refreshed on storage device 130 in order to reduce residual bit error rates (RBER). Statistics 410 may be maintained for any form of storage block including both physical blocks (such as blocks 320-370 described with respect to FIG. 3B) and logical blocks (such as logical blocks 310). Statistics 410 may also be maintained on a physical- or logical-address basis as well as for a range of addresses. In some embodiments, statistics 410 are maintained within RAM 120 and periodically stored to storage device 130—e.g., upon shutdown of computing system 100, in one embodiment. In other embodiments, statistics 410 may be maintained elsewhere such as within storage device 130, storage device 140, or external to computing system 100. For example, in one embodiment, write statistics 414 may be stored (along with other metadata) in an initial storage block of each logical erase block 320. Although statistics 410 have been described as being maintained by driver 126, in some embodiments, statistics 410 may be maintained by an entity other than driver 126 such as an application 122, OS 124, controller 132, circuitry within a bank 134, etc.

RBER read statistics 412, in one embodiment, are statistics indicative of the likelihood that read disturb errors may occur. In one embodiment, information 412 may include the numbers of read operations for storage blocks. For example, in some embodiments, driver 126 maintains a respective count value for each bank 134 in storage device 130. Accordingly, when a read operation is performed for a packet 360 within that bank 134, driver 126 may increment the count value. In one embodiment, driver 126 may reset the count value to an initial value upon the storage block being reclaimed. In other embodiments, however, count values may be reset responsive to other reset events such as at writing or data, drive format, when recovering from a drive crash, etc. Read statistics 412 may, alternatively, include rates—e.g., a value indicating that a read operation on average occurs with every N seconds for a given storage block. Read statistics 412 may also include timestamps indicative of when read operations occurred—e.g., a timestamp indicative of when a last read operation occurred for a given storage block. As used herein, the term "timestamp" refers generally to any value indicative of a particular instance in time. Timestamps may include, for example, the value of a counter that is updated periodically, a value including a date, hours, minutes, and/or seconds, etc.

RBER write statistics 414, in one embodiment, are statistics indicative of how long data has persisted in storage device. As with read statistics 412, write statistics 414 may take any suitable form. Accordingly, in one embodiment, write statistics 414 may include timestamps indicative of when write operations occurred to storage blocks. In some embodiments, such a timestamp is recorded for each logical erase block 320 upon performing a program operation to that block 320—e.g., a program operation of an initial page 340, a last page 340, etc. The timestamp of a given storage block may be compared to the current time to determine how frequently write operations occur. That is, if a storage block has an old timestamp, the storage block has not been written recently, and thus has low write frequency. A storage block that has a recent timestamp may be more likely to have a higher write frequency. In other embodiments, write statistics 414 may include the number of write operations for storage blocks, sequence numbers indicative of an ordering in which storage blocks were written, distance information indicative of how far a storage block is from an append point 382 or tail 384 (e.g., expressed as a number for storage blocks located between), etc.

Estimated workload statistics 420, in one embodiment, are statistics that are derived based on maintained statistics 410 and that are indicative of how frequently a storage block is accessed. As discussed above with respect to FIG. 1, in some embodiments, statistics 420 may be estimated for smaller storage blocks that are included within larger storage blocks for which statistics 410 are maintained. For example, in some embodiments, it may be particularly beneficial to determine statistics for LBAs (or LBA ranges as discussed below). As with statistics 410, statistics 420 may be estimated, however, for any suitable physical or logical storage blocks, physical or logical addresses, and ranges of addresses. In some instances, estimated statistics 420 may be computed from statistics 410—e.g., according to a formula. In other instances, estimated statistics 420 may correspond directly to statistics 410—i.e., without undergoing any modification. In the case that maintained statistics 410 for physical storage blocks are being used as proxies for estimated statistics 420 for logical storage blocks (or logical addresses), driver 126 may use map 128, in various embodiments, to determine associations of logical blocks to physical blocks. For example, in one embodiment, driver 126 may maintain statistics 410 for logical erase blocks 320 and receive a request (e.g., from groomer 430 discussed below) for an access frequency statistic 420 for a logical block 310. Accordingly, driver 126 may access map 128 to translate the LBA of the block 310 to a corresponding physical address. Driver 126 may then identify a particular logical erase block 320 as having the physical address corresponding to the LBA, and determine to use an access frequency statistic 410 maintained for that logical erase block 320 as a proxy for the requested access frequency statistic.

Read frequencies 422, in one embodiment, are estimated statistics indicative of how frequently read operations of storage blocks may have been performed. As with read statistics 412, read frequencies 422 may take any suitable form such as the number of read operations for a storage block, a rate, a timestamp, etc. In one embodiment, if a given read frequency 422 for a first storage block is being determined from a maintained number of read operations 412 for a second, large storage block that includes the first storage block, the given read frequency 422 may be calculated by computing an average distribution from the maintained read statistics 412. Accordingly, driver 126 may calculate a read frequency 422 for an LBA by dividing a read count 412 for a bank 134 associated with the LBA by the number of physical addresses of that bank 134. Alternatively, in another embodiment, driver 126 may use a read count 412 as an upper bound (or lower bound) for an estimated read frequency 422. It is noted that, depending on how an estimated frequency 422 is determined, it may be more accurate with respect to a particular storage block that has a lower read frequency than with respect to a storage block that has a higher read frequency—or, alternatively, an even distribution of read operations. That is, if a given bank 134 has experienced few read operations, it can be deduced that any storage block within that bank 134 also has experienced few read operations. On the other hand, if a given bank 134 has experienced several read operations, it may still be the case that a given storage block within that bank 134 has not been read at all.

In some embodiments, driver 126 may also estimate read frequencies 422 for a range of storage blocks or addresses. In one embodiment, an estimated read frequency 422 for a given range may be computed from multiple maintained read statistics 412 if a given range spans multiple storage blocks for which read statistics 412 have been maintained. For example, a request for an estimate 422 (not to be confused with a data request) may specify an LBA range that spans multiple banks 134. Accordingly, driver 126 may combine the respective statistics 412 for those banks 134 by computing an average distribution for each LBA and summing the results. In some embodiments, particular statistics 412 may be weighted more heavily depending how the range spans the blocks. For example, if several LBAs within the range mapped to a particular bank 134, the read count for the bank 134 may be weighted more heavily than other banks 134 associated with the range.

Write frequencies 424, in one embodiment, are estimated statistics indicative of how frequently write operations of storage blocks may have been performed. As with write statistics 414, write frequencies 422 may take any suitable form such as the number of write operations for a storage block, a rate for storage block, a timestamp associated with a storage block, etc. In one embodiment, if a write frequency 424 is being determined from a maintained number of write operations, the write frequency 424 may be estimated in a similar manner as read frequencies 422 discussed above. In one embodiment, if a write frequency 424 is being determined for a first storage block based on a maintained timestamp 414 for a second, larger storage block that includes the first storage block, driver 126 may estimate the write frequency 424 based on the timestamp as well as the timestamp of the most recently written storage block (e.g., the position of head 382). In some embodiments, driver 126 may further prorate the estimate 424 based on the position of the first storage block within the second storage block. For example, driver 126 may use timestamps maintained for one or more adjacent storage blocks to computer the estimate and weight those timestamps depending on the position of the first storage block. Accordingly, if the first storage block is located near the start of another large storage block (as is the case in FIG. 3C for page 340D and LEB 320), more weight may be given to the timestamp of the adjacent storage block than the timestamp of the storage block that includes the storage block of the estimate. Similar to estimated read frequencies 422, in some instances, determining an estimated write frequency 424 in this manner may be more accurate with respect to a storage block that has a lower write frequency than with respect to a storage block that has a higher write frequency.

In some embodiments, driver 126 may also estimate write frequencies 424 for a range of storage blocks or addresses. In one embodiment, such an estimate may be computed for a given range from multiple maintained write statistics 414—particularly, if a given range spans multiple storage blocks for which write statistics 414 have been maintained. For example, if an LBA range spans multiple erase blocks for which timestamps 414 are maintained, driver 126 may combine timestamps 414 for the erase blocks by computing, in some embodiments, an average of the timestamps, using one of timestamps as a maximum bound, using one as a minimum bound, etc. In some embodiments, particular statistics 414 may be weighted more heavily depending how the range spans the blocks. For example, if several LBAs within the range map to a particular erase block, the write frequency 414 for that erase block may be weighted more heavily than other erase blocks associated with the range. Still further, prorating may be performed depending upon where particular elements of the range are located within storage blocks as discussed above.

Estimated statistics 420 may be used for any of various purposes. As noted above, in one embodiment, groomer 430 and cache manager 440 may use such statistics to facilitate garbage collection and cache management, respectively. In other embodiments, statistics 420 may be used to afford applications 122 one or more quality of service (QoS) levels, organizing data within a storage device, determining storage device longevity, etc. In sum, the depiction of statistics 420 as being provided to groomer 430 and cache manager 440 should not be seen as limiting, but rather as a depiction of an exemplary embodiment.

Groomer 430, in one embodiment, is executable to identify and reclaim storage blocks so that they can be subsequently programmed to store data. In various embodiments, groomer 430 may be invoked when the amount of available space in storage device 130 (i.e., the number of storage blocks that are able to currently be programmed) falls below a threshold. Groomer 430 may then identify candidate storage blocks to be reclaimed (e.g., erased in the case of flash media) and copy any remaining valid data out of the block by writing it forward in the log structure (i.e., to the append point). Groomer 430 may use any of various criteria for selecting storage blocks for reclamation. In one embodiment, groomer 430 selects storage blocks based on the temperature of data (i.e., how frequently the data is accessed) as indicated by estimated statistics 420. In particular, groomer 430 may favor storage blocks that have data that is not modified frequently (indicating that such data is cold data) or is read frequently (indicating that such data may need to be refreshed). In some embodiments, groomer 430 may identify data that has not been modified frequently based on it being in storage blocks (e.g., logical blocks 310) that have a low write frequency as indicated by statistics 420. In some embodiments, groomer 430 may identify data that has been read frequently (indicating that such data is cold data) based on it being in storage blocks that have high read frequencies as indicated by statistics 420. In various embodiments, groomer 430 may also select blocks based on additional factors such as the amount of invalid data in those blocks or the amount of erroneous data detected when data is read from those blocks. In some embodiments, groomer 430 (or some other process) may group data together on the storage device having a common access frequency statistic as indicated by the estimated access frequency statistic. Accordingly, in one embodiment, data classified as cold data (e.g., responsive to having an access frequency below a given threshold) may be grouped together into one or more logical erase blocks 320 for cold data, while data classified as hot data (e.g., according to a given threshold) may be grouped together into one or more logical erase blocks for hot data.

Cache manager 440, in one embodiment, is executable to configure storage device 130 as a cache for storage device 140, as discussed above. Accordingly, cache manager 440 may use various criteria for determining whether to load data from storage device 140 into cache entries within storage device 130 as well as various criteria for determining whether to evict data from storage device 130. In various embodiments, cache manager 440 may determine whether to load or evict data based on its temperature as indicated by estimated statistics 420. That is, cache manager 440 may load data into the cache in response to determining that the data is associated with storage blocks (e.g., logical blocks 310) having higher access frequencies. Data determined to be associated with storage blocks having lower access frequencies, however, may not be loaded into the cache or may be selected for eviction if it has already been loaded.

Figure 5:
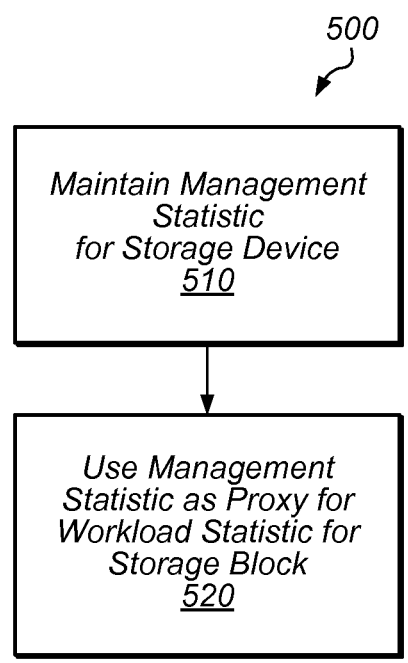
FIG. 5 is a flow diagram illustrating one embodiment of a method.

Turning now to FIG. 5, a flow diagram of a method 500 is depicted. Method 500 is one embodiment of a method that may be performed by an apparatus such as computing system 100 or storage device 130. Accordingly, in one embodiment, the apparatus may execute program instructions of a driver such as driver 126 to perform method 500. In some embodiments, performance of method 500 may improve management of a storage device with respect to, for example, data organization, garbage collection, cache management, etc.

In step 510, a management statistic for a storage device is maintained (e.g., a statistic 410). In some embodiments, data in the storage device is organized using a log structure (e.g., log structure 380). In one embodiment, the management statistic is a timestamp indicative (e.g., information 414) of when a write operation was performed for a storage block (e.g., logical erase block 320). In one embodiment, the management statistic is a number of read operations (e.g., information 412) performed for the storage block. In some embodiments, step 510 includes maintaining a respective management statistic for each of a plurality of storage blocks within the storage device.

In step 520, the management statistic is used as a proxy for a workload statistic (e.g., statistics 420) for a storage block within the storage device. In one embodiment, the storage block is a first storage block (e.g., block 360) included within a second storage block (e.g., logical erase block 320 or bank 134) of the storage device. In such an embodiment, the management statistic is maintained for the second storage block. In one embodiment, the workload statistic is a write frequency (e.g., a write frequency 424) of the first storage block. In one embodiment, the using includes deriving, based on the number of read operation maintained in step 510, a read frequency for the first storage block as the workload statistic. In some embodiments, step 520 includes mapping a set of one or more logical addresses (e.g., LBAs) to a corresponding set of one or more physical addresses. The set of one or more physical addresses may include a physical address of the storage block. Step 520 may further include based on the mapping, selecting the management statistic from among a plurality of management statistics as the proxy for the workload statistic. In some embodiments, step 520 may further include approximating a workload statistic for an address range associated with data spanning two or more of the plurality of storage blocks such that the approximating is performed using management statistics of the two or more storage blocks. In some embodiments, step 520 includes using the workload statistic to identify a storage block for garbage collection (e.g., using groomer 430).

Figure 6A:
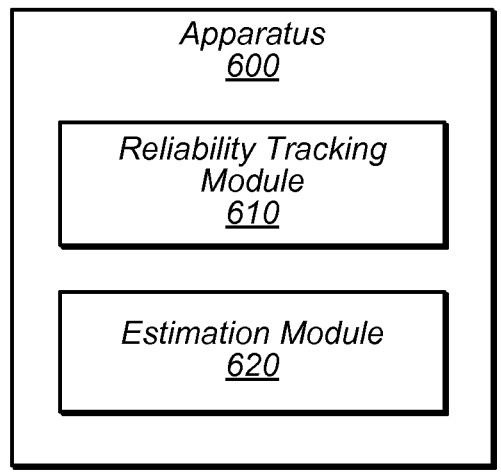
FIGS. 6A and 6B are block diagrams illustrating embodiments of apparatuses that include modules.

Turning now to FIG. 6A, a block diagram of an apparatus 600 including modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 600 may include modules to implement any of the functionality described herein. For example, in the illustrated embodiment, apparatus 600 includes a reliability tracking module 610 and an estimation module 620.

Reliability tracking module 610, in one embodiment, is configured to track a reliability statistic (e.g., statistic 410) indicative of a reliability of a storage block within a storage device to store data accurately. In one embodiment, the apparatus is configure to store data in the storage device in a log-based structure having an append point; the reliability statistic is a timestamp indicative of an initial write operation to the storage block. In one embodiment, the reliability statistic is a number of read operations. In some embodiments, module 610 is configured to track reliability statistics for a plurality of storage blocks within the storage device. In one embodiment, module 610 maintains the reliability statistics in a volatile memory (e.g., RAM 120) of a computing system, and stores the statistics to the storage device in response to a shutdown of the computing system.

Estimation module 620, in one embodiment, is configured to estimate an access frequency statistic for an address (e.g., an LBA) associated with data in the storage block. In one embodiment, the estimated access frequency statistic is a write frequency statistic. In some embodiments, estimation module 620 is configured to estimate the write frequency statistic based on the timestamp and a timestamp of a storage block corresponding to the append point. In some embodiments, estimation module 620 is further configured to estimate the write frequency statistic for the address based on a position of the data within the storage block and a timestamp of another storage block adjacent to the storage block. In one embodiment, the estimated access frequency statistic is a read frequency statistic. In some embodiments, the estimation module is configured to use reliability statistics for two or more storage blocks to estimate the access frequency statistic for an address range (e.g., an LBA range) associated with data spanning the two or more storage block. In some embodiments, apparatus 600 is configured to group data together on the storage device having a common access frequency statistic (e.g., grouping hot data together and cold data together on storage device 130) as indicated by the estimated access frequency statistic.

In some embodiments, reliability tracking module 610 and/or estimation module 620 are within a controller such as controller 132. In another embodiment, modules 610 and/or 620 may be located within a memory such as memory 120. In sum, the modules of apparatus 600 may be implemented in any suitable manner to perform functionality described herein. Apparatus 600 may also correspond to any suitable structure having the functionality of modules 610 and 620. In one embodiment, apparatus 600 is a computing system that includes (or is coupled to) a storage such as storage device 130. In another embodiment, apparatus 600 is a card including a controller (such as controller 132) and one or more storage elements (such as storage banks 134). In yet another embodiment, apparatus 600 is a computing system including a memory system that stores modules 610 and 620.

In some embodiments, apparatus 600 may include modules in addition to the ones shown. Accordingly, in one embodiment, apparatus 600 may include a cache management module (e.g., implementing functionality of cache manager 440) configured to operate the storage device as a cache for another storage device (e.g., storage device 140). The cache management module may be configured to identify entries to be loaded into the cache and entries evicted from the cache based on the estimated number of read operations. In some embodiments, apparatus 600 may also include a groomer module discussed next with respect to FIG. 6B.

Figure 6B:
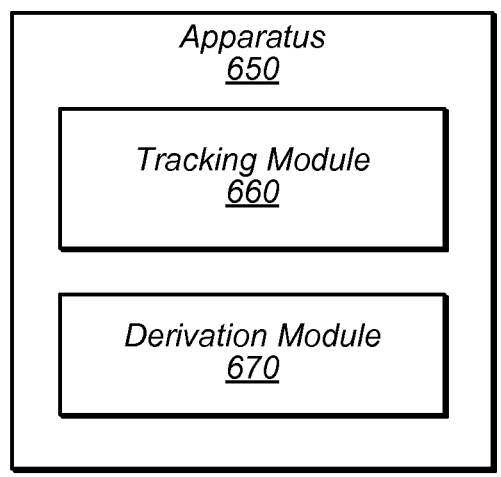

Turning now to FIG. 6B, a block diagram of an apparatus 650 including modules is depicted. Apparatus 650 may include modules to implement any of the functionality described herein and may correspond to any suitable structure such as those discussed above with respect to apparatus 600. In the illustrated embodiment, apparatus 650 includes a tracking module 660 and a derivation module 670.

Tracking module 660, in one embodiment, is configured to track a first access frequency statistic for a storage block within a storage device. In various embodiments, this first access frequency statistic may correspond to any of statistics 410 discussed above—it is noted that these statistics may be considered as a form of access frequency statistic. In some embodiments, tracking module 660 is configured to track access frequency statistics for each of a plurality of storage blocks within the storage device. In one embodiment, the first storage block is a logical erase block (e.g., block 320) spanning a plurality of storage banks (e.g., banks 134) of the storage device, where each storage bank includes a plurality of physical erase blocks (e.g., block 350).

Derivation module 670, in one embodiment, is configured to derive, based on the first access frequency statistic, a second access frequency statistic (e.g., a statistic 420) for a second storage block included within the first storage block. In some embodiments, derivation module 670 is configured to derive an access frequency statistic for a range of addresses associated with data spanning two or more of the plurality of storage blocks. In such an embodiment, derivation module 670 is configured to estimate the access frequency statistic for the range by combining the tracked access frequency statistics for the two or more storage blocks. Combining tracked access frequency statistics may be performed in any suitable manner as discussed above such as summing, averaging, computing a weighted average, selecting a minimum one (or a maximum one) of the statistics as a representative for the group, etc.

In some embodiments, apparatus 650 may include modules in addition to the ones shown. Accordingly, in one embodiment, apparatus 650 includes a groomer module (e.g., implementing functionality of groomer 430) configured to reclaim storage blocks within the storage device. The groomer module may be configured to identify storage blocks for reclamation based on the estimated access frequency statistic. In some embodiments, apparatus 650 may also include reliability tracking module 610 and/or the cache management module discussed above with respect to FIG. 6A.

Figure 7A:
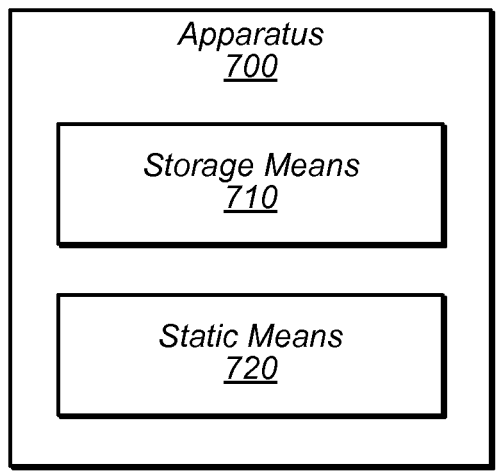
FIG. 7A is a block diagram illustrating another embodiment of an apparatus having a storage means and a statistic means.

Turning now to FIG. 7A, a block diagram of an apparatus 700 including a storage means 710 and a statistic means 720 is depicted. Apparatus 700 may correspond to any suitable structure having the functionality of storage means 710 and statistic means 720. For example, apparatus 700 may be any suitable type of computing device such as a server, laptop, desktop, a mobile device, etc. In some embodiments, apparatus 700 may include multiple computing devices working together. In some embodiments, apparatus 700 is a card including a controller (such as controller 132) and one or more storage elements (such as storage banks 134).

In various embodiments, storage means 710 may implement any of the functionality described herein with respect to storage device 130. Accordingly, in one embodiment, storage means 710 is for storing data using a log-structure. Storage means 710 may correspond to any suitable structure such as those discussed above with respect to storage device 130 (e.g., one or more banks 134, computing system 100, storage system 200, etc.). Accordingly, the phrase "means for storing data using a log-structure" refers to any of the structures listed above as well as their corresponding equivalents.

In various embodiments, statistic means 720 may implement any of the functionality described herein with respect to driver 126. Accordingly, in one embodiment, statistic means 720 is for using a first access frequency statistic for a first of the plurality of storage blocks as a proxy for a second access frequency statistic for a second storage block included within the first storage block. As discussed above, in various embodiments, the access frequency statistics may include read and/or write frequency statistics. In some embodiments, statistic means 720 may also implement functionality other than that described in conjunction with driver 126.

Statistic means 720 may correspond to any suitable structure. In one embodiment, statistic means 720 is a hardware circuit configured to perform operations (e.g., controller 132). The hardware circuit may include, for example, custom very-large-scale integration (VLSI) circuits or gate arrays, off-the-shelf semiconductors such as logic chips, transistors, or other discrete components. Means 720 may also be implemented in programmable hardware devices such as field programmable gate arrays, programmable array logic, programmable logic devices, or the like. In another embodiment, statistic means 720 includes a memory having program instructions stored therein (e.g., RAM 120) that are executable by one or more processors (e.g., processor unit 110) to implement an algorithm. In one embodiment, statistic means 720 implements the algorithm discussed with respect to FIG. 7B. In some embodiments, statistic means 720 corresponds to modules 610, 620, 660, and/or 670. Accordingly, the phrase "means for using a first access frequency statistic" refers to any of the structures listed above as well as their corresponding equivalents.

Figure 7B:
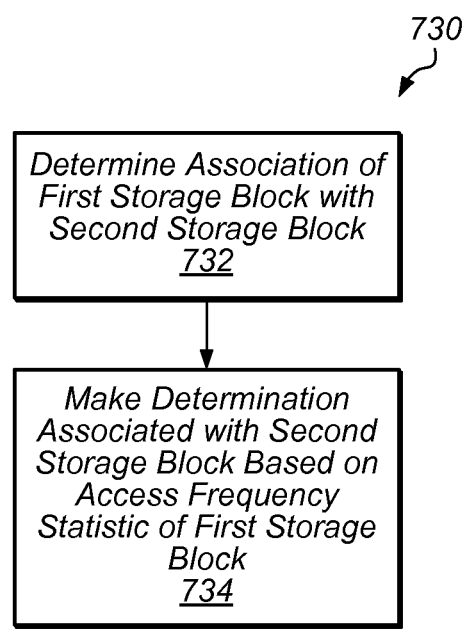
FIG. 7B is a flow diagram illustrating one embodiment of an algorithm implemented by a statistic means.

Turning now to FIG. 7B, a flow diagram illustrating an algorithm 730 is depicted. Algorithm 730 is one embodiment of an algorithm implemented by statistic means 720. In the illustrated embodiment, algorithm 730 includes, at step 732, determining an association of a first storage block with a second storage block. As discussed above, in one embodiment, this determination may include translating an LBA for a logical block 310 (the second storage block in this example) to a corresponding physical address and identifying the storage block for which a statistic has been maintained and that includes the physical address (the first storage block in this example). Algorithm 730 further includes, at step 734, making a determination associated with the second storage block based on the access frequency statistic of the first storage block. As discussed, step 734 may include determining to load the second storage block into a cache, garbage collect the second storage block, etc.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Additionally, as will be appreciated by one of ordinary skill in the art, principles of the present disclosure may be reflected in a computer program product on a machine-readable storage medium having machine-readable program code means embodied in the storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a machine-readable memory that can direct a computer or other programmable data processing apparatus to function in a particular manner, such that the instructions stored in the machine-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. An apparatus, comprising:
   a tracking module configured to track a first access frequency statistic for a storage block within a storage device; and
   a derivation module configured to derive, based on the first access frequency statistic, a second access frequency statistic for a second storage block included within the first storage block.

2. The apparatus of claim 1, wherein the tracking module is configured to track access frequency statistics for each of a plurality of storage blocks within the storage device; and
   wherein the derivation module is configured to derive an access frequency statistic for a range of addresses associated with data spanning two or more of the plurality of storage blocks, wherein the derivation module is configured to derive the access frequency statistic for the range by combining the tracked access frequency statistics for the two or more storage blocks.

3. The apparatus of claim 1, further comprising:
   a cache management module configured to operate the storage device as a cache for another storage device;
   wherein the cache management module is configured to identify entries to be loaded into the cache and entries to be evicted from the cache based on the second access frequency statistic.

4. The apparatus of claim 1, wherein the first storage block is a logical erase block spanning a plurality of storage banks of the storage device, wherein each storage bank includes a plurality of physical erase blocks.

5. An apparatus, comprising:
   a first means for storing data using a log-structure, wherein the first means includes a plurality of storage blocks; and
   a second means for using a first access frequency statistic for a first of the plurality of storage blocks as a proxy of a second access frequency statistic for a second storage block included within the first storage block.

6. The apparatus of claim 5, wherein the first means includes a solid-state storage array.

\* \* \* \* \*